Feb. 13, 1945.  A. G. REYNOLDS  2,369,406
FRUIT AND VEGETABLE JUICE EXTRACTOR
Filed Jan. 10, 1942    2 Sheets-Sheet 1

INVENTOR.
Albert G. Reynolds
BY Gardner & Warren
his ATTORNEYS.

INVENTOR.
Albert G. Reynolds
BY Gardner & Warren
his ATTORNEYS.

Patented Feb. 13, 1945

2,369,406

UNITED STATES PATENT OFFICE 2,369,406

FRUIT AND VEGETABLE JUICE EXTRACTOR

Albert G. Reynolds, Oakland, Calif.

Application January 10, 1942, Serial No. 426,597

7 Claims. (Cl. 146—3)

The invention relates to fruit and vegetable juice extractors such as disclosed in my copending applications, Serial No. 215,560, filed June 15, 1938, and Serial No. 288,982, filed August 8, 1939, with respect to which latter this application is a continuation-in-part.

Fruit and vegetable juice extractors of the type to which the present invention relates include a grinding or comminuting device in combination with a rotary perforated bowl centrifuge, and, as will be understood, are required to operate at relatively very high speeds in the order of 10,000 revolutions per minute in order to obtain sufficient centrifugal force to express the juice from the ground pulp of various types of vegetables, wherein the liquid content is more firmly held in the pulp than is the case with other food stuffs as for example, fruits. At such high speed rotation problems of proper alignment and dynamic balance are naturally accentuated and unless the driven parts are mounted and constructed with precision, the machine is subject to undue vibration and wear. In accordance with the present invention and as a principal object thereof, I provide a new and improved organization of supporting structure for the electric motor and driven parts which greatly simplifies the problems of support and alignment of the drive and driven parts whereby the latter may be quickly and readily assembled and ruggedly held in proper coaxial relationship for high speed rotation.

Another object of the invention is to provide a juice extractor of the character described which is generally improved in its design over previous machines, affording greater compactness and yet providing ample space for air circulation and permitting ease of assembly, fewer and lighter weight parts, reduction in cost, and better and longer life of operation.

A further object of the invention is to provide in the supporting structure above mentioned a novel one-piece supporting member for unitarily mounting and aligning the motor and driven parts.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
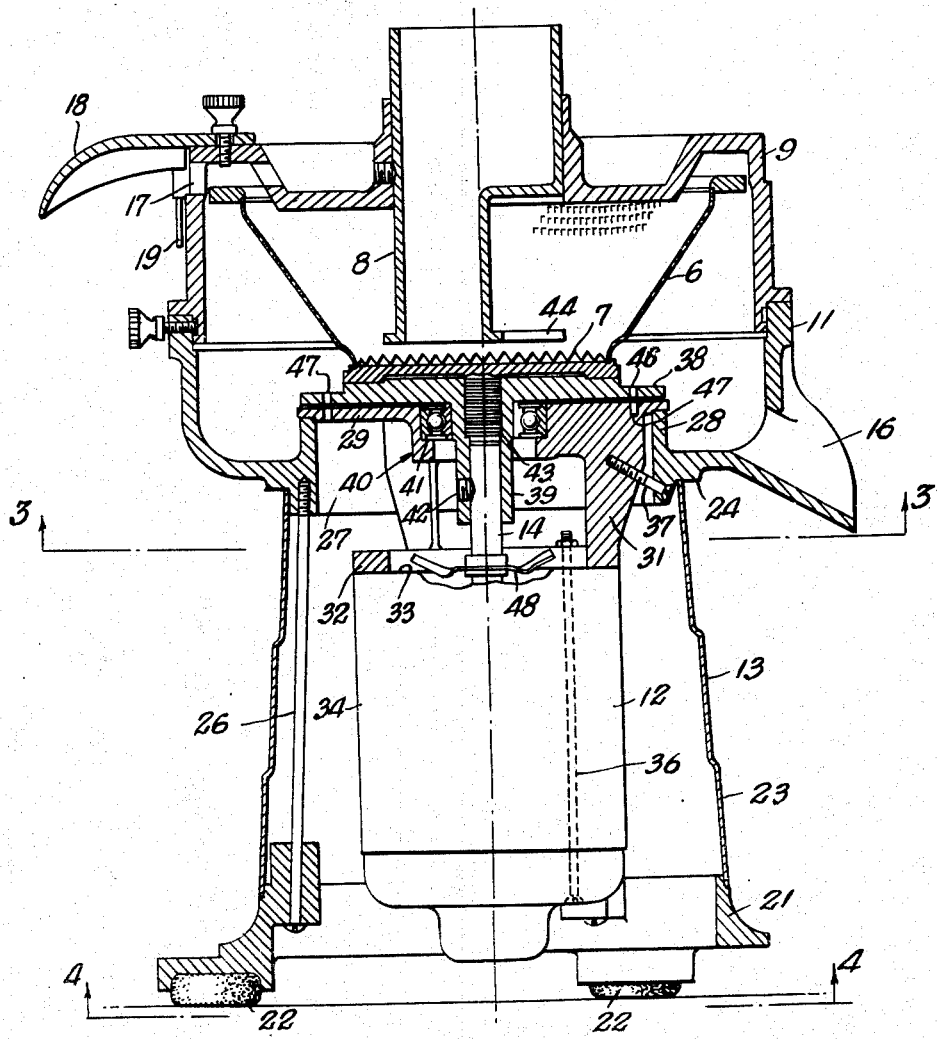
Figure 1 is a vertical sectional view of a fruit and vegetable juice extractor constructed in accordance with the present invention.
Figure 2:
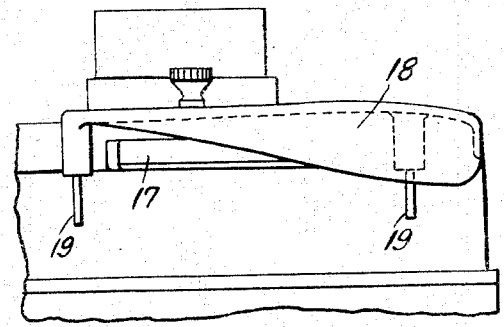
Figure 2 is a fragmentary front elevation showing the pulp discharge portion of the machine.
Figure 3:
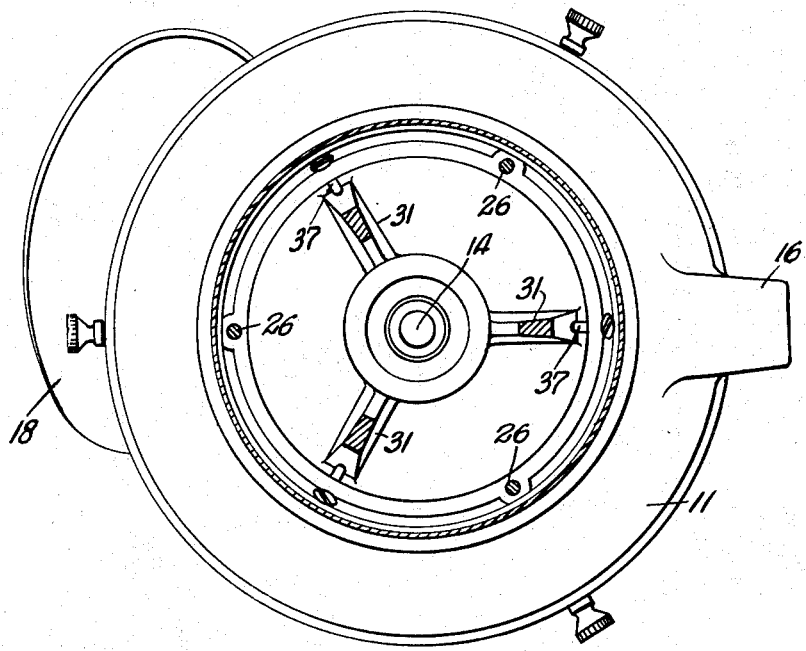
Figure 3 is a cross sectional view of the machine taken substantially on the plane of line 3—3 of Figure 1.
Figure 4:
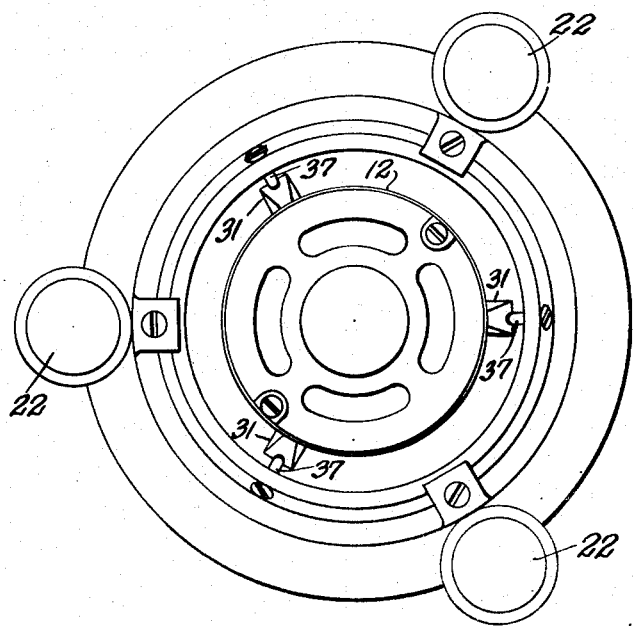
Figure 4 is a bottom view of the machine as indicated by the line 4—4 on Figure 1.

The apparatus herein disclosed in common with the apparatus disclosed in my copending applications above referred to, includes the general combination of a rotary perforated pulp bowl 6 mounted to rotate about a substantially vertical axis and having a grater disc 7 in the bottom thereof which is adapted to receive fruits and vegetables pressed downwardly against the rotating disc 7 by way of a feed tube 8, the latter being supported vertically in a cover plate 9 mounted on top of a juice receiving casing or receptacle 11 surrounding the bowl 6. The bowl is rotated at a high velocity by means of an electric motor 12 mounted vertically within a hollow base support 13 and having the motor shaft 14 thereof connected to the bottom of the bowl. In operation, fruits and vegetables and the like are pressed downwardly through the feeder tube 8 against the rotating grater disc which grinds the food to a pulp and throws the same centrifugally against the perforated side wall of the bowl, through which the juice is centrifugally expressed into the casing 11 and discharged from a spout 16 formed in the casing. The side wall of the bowl is inclined outwardly upwardly from the bottom of the bowl, whereby the pulp is caused to travel upwardly over the side wall and the pulp is discharged from the top of the basket from a pulp discharge slot 17 provided in the cover member 9. A hood 18 is preferably mounted over the discharge slot 17, so as to confine the discharge of the pulp and if desired a receiving bag, not shown, may be attached to the hood for catching the pulp, the hood in the present case being formed with depending pins 19 for attachment of such a bag.

In the present construction, the base support for the apparatus consists of a ring-like base member 21, preferably of cast metal and provided with a plurality of rubber feet 22. The casing 11 is supported in elevated position over the base ring 21 by means of a relatively thin walled hollow cylindrical 23 clamped endwise between the base ring 21 and the bottom wall 24 of the casing, by means of a plurality of clamping screws 26.

As will be best seen from Figure 1 of the drawings, the bottom 24 of the casing 11 is formed with a central opening 27 therein defined by an upstanding flange 28 on the bottom of the casing surrounding the opening. Mounted directly upon and clamped against the top of this flange is a supporting plate 29 of disc-like form which has integrally secured thereto a plurality of depending arms 31 which terminate at their lower ends in a mounting ring 32. In the present construction, the usual upper end cap on the motor is deleted, leaving a plain open upper end 33 at the top of the motor housing 34, and the end 33 of the motor housing is clamped directly against the mounting ring 32 by means of a plurality of clamping bolts 36, usually used for clamping the heads or caps of the motor housing. Thus the motor housing is supported directly from its open upper end 33 in suspended relation to and concentric with the casing 11. Preferably the mounting plate 29 is clamped in place across the top of the flange 28 and held against relative rotation with respect to the casing 11 by means of a plurality of screws 37 connecting a base depending part of flange 28 to each of the arms 31 and as here shown, the screws are threaded into the arms and are mounted on an incline so that a tightening of the screws will cause the closure plate 29 to be drawn forcibly against the top of the flange 28.

In the present construction, the bowl is supported on a rotary plate or disc 38 mounted over the plate 29 and having a centrally depending stem 39 journaled for rotation in plate 29 by means of a bearing 41. As here shown, the bearing is supported directly in the plate 29 and the stem 39 projects downwardly through the bearing and is formed with a longitudinal bore telescoping over and secured to the upper end of the motor shaft. Preferably press fit is provided between the shaft and the stem to insure positive alignment and a tight connection, and also a set screw 42 carried by the stem and engaging the shaft may be used.

The disc 38 is preferably of approximately the same diameter as the plate 29 and is mounted in close parallel relation thereto, thereby making the passage thus provided between the two discs connecting the bearing 39 with the juice receiving chamber, so long and restricted as to prevent any entry of the juice to the bearing. The bottom 7 of the bowl is formed with a centrally depending threaded pin 43 which is threaded into a central receiving socket 44 in the rotary disc 38, whereby the bowl is supported for concentric rotation with the disc. Preferably the discs 29 and 38 are formed with alignable openings 46 and 47 adapted for receipt of a locking pin (not shown) for holding the disc 38 against rotation to permit the threaded attachment and detachment of the bowl.

In accordance with the foregoing, it will be seen that a single unitary part, herein denoted by numeral 40 and including the plate 29, arms 31 and ring 32, serves to completely support the motor and driven parts. The location of bearing 41 and the press fit of stem 39 on the motor shaft 14 positively and readily locates the motor shaft and rotary disc 38 in alignment and locates the open end 33 of the motor housing against the ring 32. The bolts 36 may thereupon be tightened to provide a rigid assembly of the motor, support, and driven parts. Thereafter, this unitary aligned assembly may be inserted and clamped in casing 11 and minor eccentricities introduced in this operation cannot affect the alignment of the motor and driven parts.

The unitary supporting member 40 also supports the motor in spaced relation to the closure plate 29 and to the cylindrical casing 13, whereby an air chamber is provided completely around the motor. A fan is mounted on the motor shaft 14 within the housing 34 and serves to circulate air longitudinally through the motor and around the exterior of the motor, it being noted in this connection that the air may pass through the open end of the motor housing and between the arms 31.

I claim:

1. In a centrifugal vegetable and fruit juice extractor having a pulp holding member mounted for rotation about a vertical axis, a casing surrounding said member for receiving juice expressed therefrom and having an open bottom, a hollow base support for said casing, a vertical electric motor including a shaft and housing mounted within said base support, means secured to said casing supporting said motor and closing said casing at the bottom thereof, and means connecting said shaft and pulp holding member for rotation over said closing means.

2. In a centrifugal vegetable and fruit juice extractor having a pulp holding member mounted for rotation about a vertical axis, an open casing surrounding said member for receiving juice expressed therefrom, a hollow base support for said casing, a vertical electric motor including a shaft and housing mounted within said base support, a closure plate for said casing attached to said motor housing, a bearing centrally mounted in said plate for supporting said shaft for rotation, and means connecting said shaft and pulp holding member to support said latter member for rotation substantially over said closure plate.

3. In a centrifugal vegetable and fruit juice extractor having a pulp holding bowl mounted for rotation about a vertical axis, a casing having an open bottom and encompassing said bowl and arranged to receive the juice discharged therefrom, a hollow base support depending from said casing, an electric motor arranged within said support including a housing and a vertical shaft extending from the upper end thereof, a closure plate sealing said casing bottom and supporting said motor housing for suspension within said support, a bearing in said plate for supporting said shaft, and means connecting said shaft and bowl for rotation.

4. A centrifugal vegetable and fruit extractor comprising, the combination of a hollow base support, a casing having an open bottom portion and mounted on the upper end of said support, a plate mounted across and secured for support to the bottom of said casing sealing same and having a depending part attached to the upper end of said motor housing and providing the exclusive support therefor, a second plate mounted over the top of said first plate and having a central depending part extending through and journaled for rotation about a vertical axis in said first plate and fastened to the upper end of said motor shaft, and a perforated bowl mounted within said casing and supported directly on and rotated by said second plate.

5. A centrifugal vegetable and fruit juice extractor comprising, the combination of a hollow base support, a casing mounted on the upper end of said support, an electric motor including a housing and shaft mounted vertically within said base support, a plate mounted across and secured to the bottom of said casing and having a depending part attached to the upper end of said motor housing, a second plate mounted over the top of said first plate and having a central depending part journaled for rotation about a vertical axis in said first plate and fastened to the upper end of said motor shaft, and a perforated bowl mounted on said second plate and having a depending center stem threaded into said second plate for securing said bowl and second plate for joint rotation, said plates being formed with alignable openings located outside of the circumference of the bottom of said bowl for receipt of a locking pin for holding said second plate against rotation to permit the threaded attachment or detachment of said bowl.

6. In a vegetable and fruit juice extractor of the character described, the combination of a hollow base support, a casing having an opening in the bottom thereof and mounted on the upper end of said support, an electric motor including a housing and shaft mounted vertically within said base support, a closure member for said opening resting upon the bottom of said casing and secured to said motor housing and supporting the latter exclusively from said closure member in spaced relation to said member and to said base support, said closure member and said motor housing being formed to permit circulation of air between said motor and said member and between said motor and said base support, and means securing said closure member to said casing for sealing said opening and for preventing relative rotation thereof.

7. In a vegetable and fruit juice extractor of the character described, the combination of a hollow base support, a casing having an opening in the bottom thereof and mounted on the upper end of said support, an electric motor including an open ended housing and shaft, a closure plate for said opening resting upon the bottom of said casing and having a plurality of depending arms, a mounting ring integral with the lower ends of said arms and secured to the open end of said motor housing for supporting the latter vertically within said hollow base support in suspended spaced relation from said closure plate and in spaced relation to the internal wall of said base support, a plurality of screws connecting said casing with each of said arms for sealing said opening and preventing relative rotation between said casing and arms, a disc mounted over the top of said closure plate and having a centrally depending stem journaled for rotation in said plate, said stem being connected to the upper end of said motor shaft, and a perforated pulp receiving bowl mounted within said casing and supported on and rotated by said disc.

ALBERT G. REYNOLDS.